US012804229B2

(12) United States Patent
McGuire et al.

(10) Patent No.: US 12,804,229 B2
(45) Date of Patent: Nov. 17, 2026

(54) METHOD AND SYSTEM FOR GENERATING DESCRIPTIVE PERSONA TEXT

(71) Applicant: ThinkAnalytics Ltd., Glasgow (GB)

(72) Inventors: Christopher McGuire, Glasgow (GB); Peter Docherty, Glasgow (GB)

(73) Assignee: ThinkAnalytics Ltd., Lanark (GB)

( * ) Notice: Subject to any disclaimer, the term of this patent is extended or adjusted under 35 U.S.C. 154(b) by 0 days.

(21) Appl. No.: 18/622,420

(22) Filed: Mar. 29, 2024

(65) Prior Publication Data

US 2025/0310602 A1 Oct. 2, 2025

(51) Int. Cl.
*H04N 21/45* (2011.01)
*H04N 21/466* (2011.01)

(52) U.S. Cl.
CPC ..... *H04N 21/4532* (2013.01); *H04N 21/4662* (2013.01)

(58) Field of Classification Search
CPC ....................... H04N 21/4532; H04N 21/4662
USPC ........................................................... 725/46
See application file for complete search history.

(56) References Cited

U.S. PATENT DOCUMENTS

| | | | |
|---|---|---|---|
| 6,567,814 B1 | 5/2003 | Bankier et al. | |
| 7,805,129 B1 | 9/2010 | Issa et al. | |
| 9,699,491 B1 | 7/2017 | Docherty et al. | |
| 9,756,390 B1 | 9/2017 | Docherty et al. | |
| 9,906,837 B1 | 2/2018 | Docherty et al. | |
| 9,973,797 B1 | 5/2018 | Docherty et al. | |
| 10,091,555 B1 | 10/2018 | Docherty et al. | |
| 10,289,739 B1 | 5/2019 | Docherty et al. | |
| 10,356,035 B1 | 7/2019 | Gravino et al. | |
| 10,412,454 B2 | 9/2019 | Docherty et al. | |
| 11,212,584 B2 | 12/2021 | Docherty et al. | |
| 11,343,573 B2 | 5/2022 | Docherty et al. | |
| 12,475,090 B2 * | 11/2025 | Fuchs | G06F 16/258 |
| 2003/0106064 A1 | 6/2003 | Plourde | |
| 2006/0212906 A1 * | 9/2006 | Cantalini | H04N 21/4532 725/62 |
| 2007/0157222 A1 | 7/2007 | Cordray et al. | |
| 2008/0255952 A1 * | 10/2008 | Yen | H04N 21/812 348/E7.071 |
| 2008/0304812 A1 | 12/2008 | Jin | |
| 2010/0005492 A1 | 1/2010 | Takano et al. | |
| 2010/0070507 A1 | 3/2010 | Mori | |
| 2011/0243529 A1 | 10/2011 | Oryoji et al. | |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — Nnenna N Ekpo
(74) *Attorney, Agent, or Firm* — Foley & Lardner LLP

(57) ABSTRACT

A computer-implemented method for generating a descriptive persona text for one or more users of a content recommendation system comprising: obtaining user data and/or associated content metadata for the one or more users, wherein the user data and/or associated content metadata is based on user activity of the one or more users; generating the descriptive persona text for the one or more users based on the user data and/or associated content metadata, wherein the generated descriptive persona text comprises at least a persona title and/or a persona description.

22 Claims, 7 Drawing Sheets

(56) References Cited

U.S. PATENT DOCUMENTS

| | | | | |
|---|---|---|---|---|
| 2012/0066234 | A1* | 3/2012 | Lee | G06Q 10/107 707/E17.084 |
| 2014/0149344 | A1 | 5/2014 | Pudipeddi et al. | |
| 2014/0279756 | A1 | 9/2014 | Whitman | |
| 2015/0082330 | A1 | 3/2015 | Yun et al. | |
| 2015/0100987 | A1 | 4/2015 | Whitman et al. | |
| 2015/0161086 | A1* | 6/2015 | Wu | G06F 40/30 715/234 |
| 2015/0269488 | A1 | 9/2015 | Galai et al. | |
| 2015/0372963 | A1* | 12/2015 | Root | H04L 51/42 709/206 |
| 2016/0132607 | A1* | 5/2016 | Skatell | G06F 16/24578 707/734 |
| 2017/0311015 | A1 | 10/2017 | Docherty et al. | |
| 2020/0042646 | A1* | 2/2020 | Nagaraja | G06F 16/345 |
| 2020/0252690 | A1 | 8/2020 | Docherty et al. | |
| 2021/0321165 | A1* | 10/2021 | Yasir | G06F 16/9535 |
| 2025/0209484 | A1* | 6/2025 | Kasmi | G06N 3/088 |
| 2025/0209544 | A1* | 6/2025 | Kong | G06Q 10/40 |

FOREIGN PATENT DOCUMENTS

| | | | |
|---|---|---|---|
| GB | 2 574 581 | A | 12/2019 |
| WO | WO-01/15449 | A1 | 3/2001 |
| WO | WO-02/27526 | A1 | 4/2002 |
| WO | WO-2008/042242 | A2 | 4/2008 |
| WO | WO-2013/186061 | A1 | 12/2013 |
| WO | WO-2021/130834 | A1 | 7/2021 |

* cited by examiner

Table 1 – CRE learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Fig. 2

METHOD AND SYSTEM FOR GENERATING DESCRIPTIVE PERSONA TEXT

TECHNICAL FIELD

The present disclosure relates to a system and method for use in a content recommendation system. In examples, the system and method includes generating descriptive text for a user or user segments of the system.

BACKGROUND

Developments in technology mean that users are able to access content via a wide array of different mechanisms, and via a wide array of different sources. For example, television channels, radio stations, video-on-demand and other streaming services, social media and other internet content sources provide a vast array of content available to a user.

By providing a large volume of content, content distribution platforms can cater to a large range of different user preferences and provide content previously unseen to a user to hold the user's interest. However, the collection and management of large volumes of user data can be technically challenging. In addition, converting the large amount of user data into useful and useable information can pose technical challenges.

SUMMARY

According to a first aspect, there is provided a computer-implemented method for generating a descriptive persona text for one or more users of a content recommendation system comprising:

- obtaining user data and/or associated content metadata for the one or more users, wherein the user data and/or associated content metadata is based on user activity of the one or more users;
- generating the descriptive persona text for the one or more users based on the user data and/or associated content metadata, wherein the generated descriptive persona text comprises at least a persona title and/or a persona description.

The method may further comprise displaying and/or storing the generated descriptive persona text. The method may comprise displaying the persona text on a display, optionally on a display of a user device. The method may comprise storing the generated descriptive persona text as data on a storage device.

Generating the descriptive persona text may comprises generating descriptive persona text data representing the descriptive persona text. The descriptive persona text may describe a user based on user actions performed in relation to their selection, viewing and other actions of content. Generating the descriptive persona text may comprise using a text generator. The descriptive persona text may represent or be indicative of the user preferences and/or tastes.

The user data and/or associated metadata may comprise data representing user preferences based on user engagement with a plurality of content items, for example, one or more content libraries. The user data and/or associated metadata may comprise or form a user profile for a user determined based on previous user engagement with a plurality of content libraries. The user data and/or associated metadata may comprise data produced by a metadata enriching process.

The method may comprise obtaining user data for a plurality of users. The method may comprise performing a clustering and/or grouping process on said user data to identify one or more clusters and/or groups of users. The method may comprise generating the descriptive persona text for each identified group based on the user data for the identified cluster and/or group.

The method may comprise identifying one or more groups of users and aggregating user data for users of said one or more groups and wherein the generation of the descriptive persona text is based on said aggregated user data.

The user data and/or associated content metadata for one or more users may comprise or represent user activity and/or content metadata associated with user activity for the one or more users.

Generating the persona text for one or more users may comprise identifying a persona category from a set of pre-determined persona categories based on the user data for the one or more users and generating the descriptive persona text based on at least the identified persona.

Generating the descriptive persona may comprise obtaining a default persona text corresponding to a persona category and performing a modification of the default persona text based on the user data and/or associated content metadata.

The descriptive persona text may comprise one or more text references to a content item and/or characteristics of a content item that the user has previously engaged, for example, based on user data and/or associated content metadata. The descriptive persona text may comprise references to content and/or characteristics of content that the user is likely to be interested in, for example, based on user data and/or associated content metadata.

Generating the descriptive persona text may comprise applying a model, for example, a machine learning or other generative artificial intelligence model to at least part of the user data and/or associated content metadata, wherein the model is configured to output the descriptive persona text. Generating the descriptive persona text may comprise applying a model, for example, a machine learning or other generative artificial intelligence model to at least part of the user data and/or associated content metadata and an identified persona category.

The model may comprise a large language model and/or a natural language processing model and/or a machine learning and/or artificial intelligence model. The model may comprise a trained machine learning and/or artificial intelligence and/or natural language processing model previously trained and/or refined on a volume of text data.

The method may further comprise providing at least part of the user data as input to a pre-determined machine learning model, for example a generative text or language model. The method may further comprise selecting one or more parameters for the model, wherein the one or more parameters are selected based on a current system performance parameter.

The one or more parameters may comprise language, a length and/or size of the title and/or description to be generated.

The user data and/or associated metadata may be represented as a feature vector or other data structure and wherein the method comprises generating a prompt or other input for a model based on said feature vector or other data structure. Generating the prompt may comprise extracting one or more features or keywords from the user data and/or associated content metadata, for example, from said feature vector.

The input may comprise a feature vector comprising one or more features for a user. The feature vector may further comprise entries representing user activity history. The feature vector may comprise a content language. The feature vector may comprise a preferred or most frequently used content language based on the user data and the method may comprise generating the descriptive text in said language.

Generating the descriptive text may comprise packaging at least part of said user data and/or associated content metadata and one or more selected parameters into one or more requests and sending said one or more requests to a further processing resource. The further processing resource may host the generative text model. The further processing resource may be configured to receive the one or more requests, generate the descriptive text based on the one or more requests and send a response signal including the generated descriptive text. The request may be packaged in the form of an API call.

The method may comprise performing a filtering and/or selection process on the user data and/or associated metadata and wherein the generating of the descriptive persona text is based on the filtered and/or selected user data and/or associated metadata.

The user vector may comprise entries representing metadata tags, labels and/or keywords and associated weights The method may comprise performing a validation process on the generated text and discarding and/or modifying and/or regenerating the descriptive text based on the outcome of the validation process. The validation process may comprise evaluating a semantic similarity or other similarity metric between the user data and the generated text.

The validation process may comprise constructing a vector or other representation of the generated descriptive text and comparing said vector or other representation to a corresponding vector or representation of the user data.

The validation process may comprise identifying predetermined stop words in the generated text and discarding the descriptive text based on identification of a stop word.

The semantic similarity evaluation may be performed using the returned descriptive text and an aggregated user vector for a plurality of users.

The user data and/or associated content metadata may comprise content attributes, properties or parameters capable of distinguishing one or more content items. The content attributes may comprise at least one of: Actor; Audience; Award; Category; Character; Character Type; Concept Source; Director; Format; Franchise; Host; Mileu; Mood; Producer; Person; Subcategory; Scenario; Setting; Sports Competition; Studio; Style; Subject; Team; Theme; Time Period; Writer. The content attributes of the user data may include content attributes and their associated weightings. The content attributes and associated weightings may be represented mathematically as a feature vector or other mathematical object.

The method may further comprise using at least part of the generated persona text to obtain one or more content item recommendation The method may further comprise displaying the one or more content item recommendations together with at least part of the generated persona text. The one or more content item recommendations and descriptive text may be displayed on a content selection interface.

The descriptive persona text may comprise a non-attributable description of a user based on their user activity In accordance with a second aspect, there is provided a system comprising processing circuitry configured to: obtain user data and/or associated content metadata for the one or more users, wherein the user data and/or associated content metadata is based on user activity of the one or more users; generate descriptive persona text for the one or more users based on the user data and/or associated content metadata, wherein the generated descriptive persona text comprises at least a persona title and/or a persona description.

In accordance with a third aspect, there is provided a non-transitory computer-readable medium that comprises computer-readable instructions that are executable to: obtain user data and/or associated content metadata for the one or more users, wherein the user data and/or associated content metadata is based on user activity of the one or more users; generate descriptive persona text for the one or more users based on the user data and/or associated content metadata, wherein the generated descriptive persona text comprises at least a persona title and/or a persona description.

Features in one aspect may be provided as features of another aspect in any appropriate combination. For example, method features may be provided as system features, and vice versa.

BRIEF DESCRIPTION OF THE DRAWINGS

Various aspects of the invention will now be described by way of example only, and with reference to the accompanying drawings, of which:

FIG. 2 is representation of certain database learning tables used by the system of FIG. 1;

DETAILED DESCRIPTION

The embodiments described below relate to methods and systems for generating descriptive text for describing a user or a group of users. The methods and system may include techniques for segmenting users or identifying a segment for a user based on user data, such as user interaction data. In particular embodiments, the descriptive text includes a description of a persona of a user that represents the interests and tastes of the user. The persona is obtained and presented in a human readable form. The descriptive persona text relates to the interests and tastes of the user and may also be referred to as a taste persona.

Providing a textual/natural language description of the user profile (or a corresponding profile for a segment or group of users) may drive engagement for a user and/or a group of users. From the clustering/segmentation process common features across the users may be identified in the segment. That could be used for segmentation, marketing to groups of similar users, possibly link where we generate personalised synopsis based on groups of users rather than for unique individuals.

In the following description groups and/or segments of users are described. It will be understood that a group or segment may include one or more users. For example, descriptive text for a user may be generated and/or text may be generated for an entire group.

In the context of content recommendation systems, it is to be understood that there may be a very large number of users posing significant technical challenges for analyzing and interpreting user activity. Therefore, providing descriptive text for users and/or groups of users in easily understandable form may provide advantages. Such segmentation and descriptions may offer advantages in a number of contexts. For example, such descriptions may allow content providers to group users in an understandable and explainable fashion. Personas may also be used as part of a content recommendation process, for example, a content recommendation may be based on an identified persona of a user.

Figure 1:
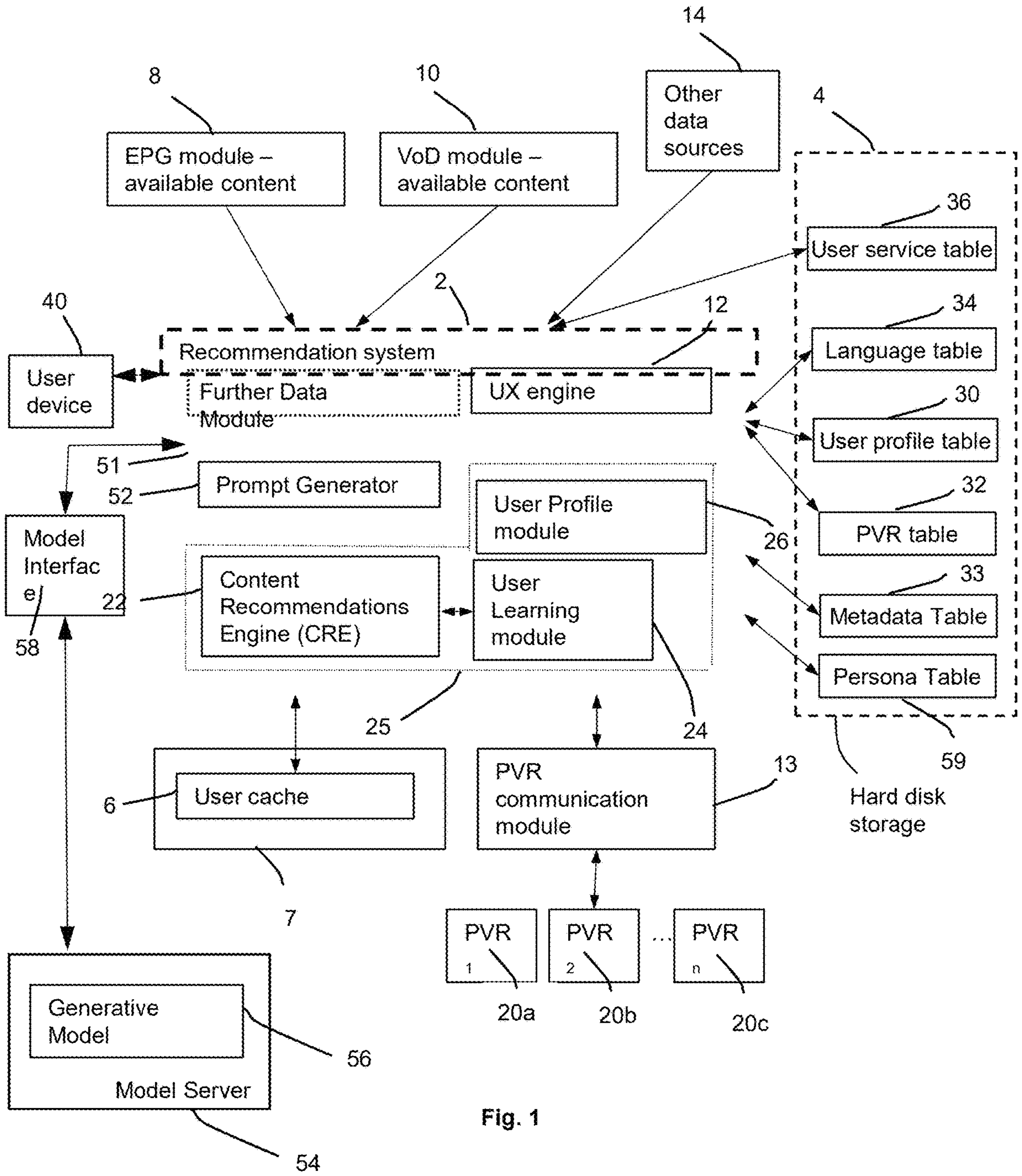
FIG. 1 is a schematic diagram of a digital content recommendation system.

FIG. 1 shows a schematic diagram of content recommendation system according to an embodiment, which is operable to generate content recommendations for users based on first party data in the form of, for example, user actions performed in relation to their selection, viewing and other actions in relation to TV content provided by a TV distribution system, and/or in relation to other content. The content recommendation system is configured to perform one or more content recommendation methods. As part of the content recommendation system, the system has additional features and modules for providing an additional level of customization. In particular, a further data module is provided as described in the following.

The system in the embodiment of FIG. 1 comprises a content recommendation system 2 that comprises a content recommendation engine (CRE) or module 22 and linked to a first storage resource in the form of a hard disk storage device 4, which is used to store various user data. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

The content recommendation engine (CRE) 22 can apply a set of processes, to determine, in real time, content recommendations for a user 205 based on user data and available content.

Figure 6:
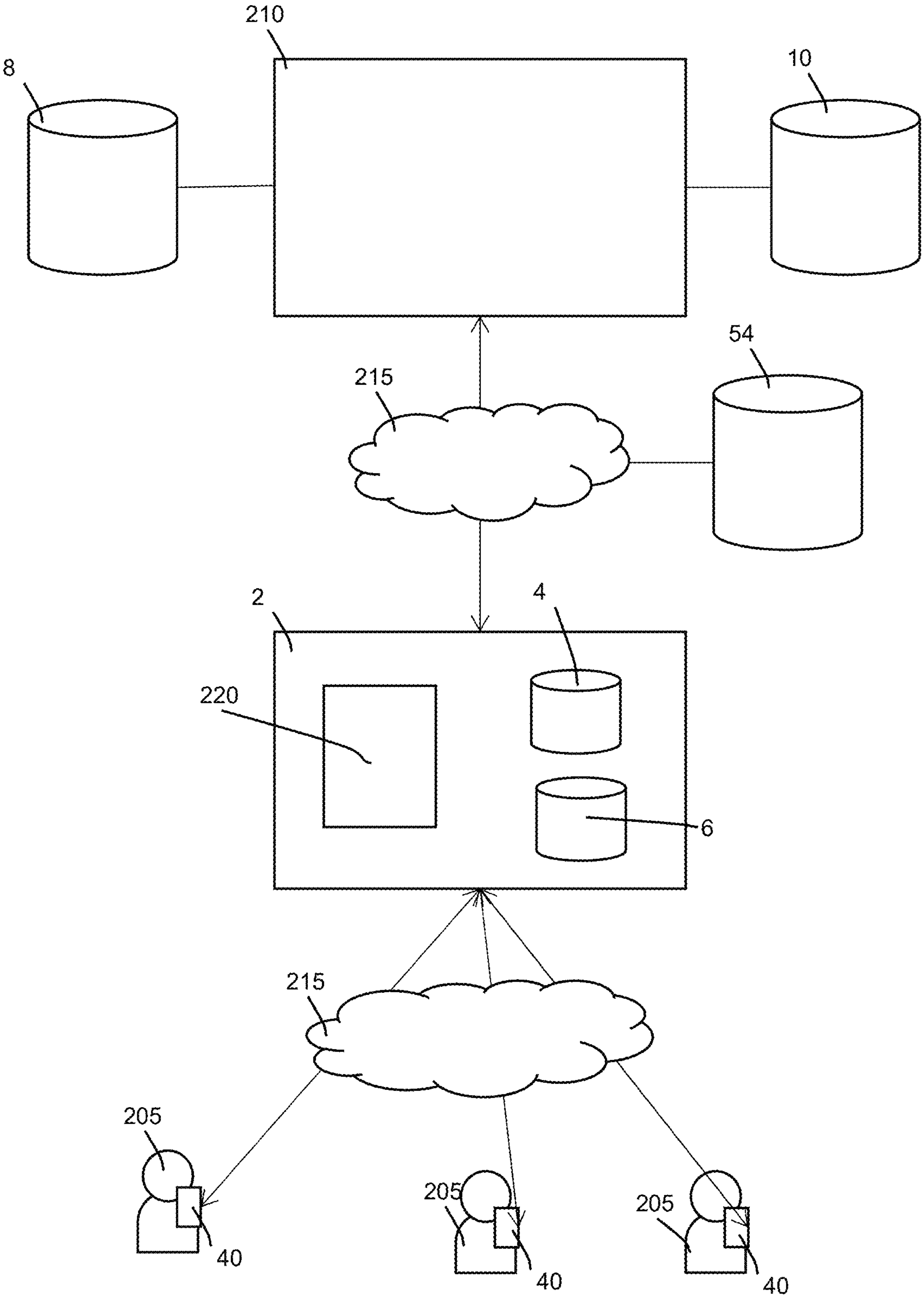
FIG. 6 is a schematic of a system arrangement.
Figure 7:
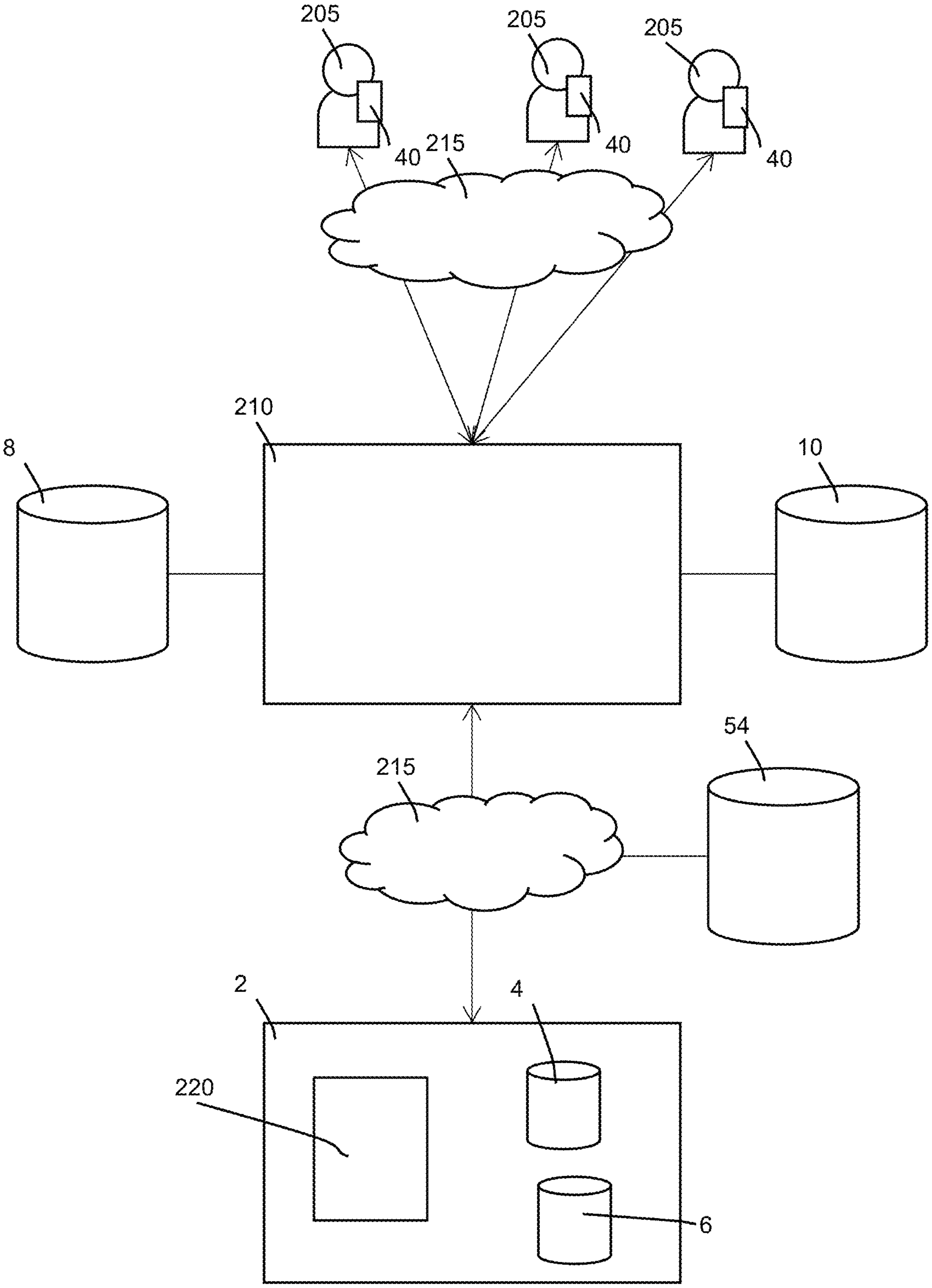
FIG. 7 is a schematic of an alternative system arrangement to that of FIG. 8.

FIG. 1 shows a schematic diagram of a system 1 that comprises a user experience (UX) engine 12 for configuring user content selection interfaces that allow users 205 (see FIGS. 6 and 7) to navigate and select content from a content service provider (210, also shown in FIGS. 6 and 7). In particular, the user experience (UX) engine 12 can be used to provide customised user content selection interfaces that are customised or otherwise specifically configured to a specific user 205 or group of users 205. The customization can comprise, for example, customizing the order in which groups of content is presented to a user 205 or groups of users 205 so that groups of content more likely to be of interest to the user 205 are presented earlier, or in preference to groups of content that are less likely to be of interest to that user 205.

In the example of FIG. 1, the user experience (UX) engine 12 is provided as part of a more general recommendation system 2 that comprises a content recommendation engine (CRE) 22 that can apply a set of processes to determine, in real time, content recommendations for a user 205 based on user data and available content. This arrangement can be beneficial as there may be some cross-over in the data utilised such that the UX engine 12 can in some examples share or otherwise leverage data used by the CRE 22, which can minimise data storage and other services required to operate both systems. However, the disclosure is not limited to this arrangement and in other examples the UX engine 12 can be provided as a dedicated stand-alone system or as part of a content provider's user interface system or in another suitable component of a content provision system or associated support system.

The UX engine 12 is configured to take into account previous interactions that the user 205 has had with user content selection interfaces. These could include interactions the user 205 has had with the user content selection interface that the system 1 is currently looking to configure and/or with other user content selection interfaces. Beneficially, such user interactions may comprise first party data in the form of, for example, user actions performed in relation to their selection, viewing and other actions in relation to content such as but not limited to TV content provided by a TV distribution system or other types of content.

FIG. 1 depicts a further data module 51. The further data module 51 has a prompt generator 52. The further data module may be configured to generate further data, in particular, descriptive text data based on user data and/or content metadata. The further data module 51 may be referred to as a persona text module. The further data module may be configured to generate descriptive text for one or more segments of users. While a generative model is described, other machine learning derived or artificial intelligence based models may be used. In some embodiments, the generative model is a large language model (LLM).

The further data module 51 is configured to communicate with one or more data sources. In the system of FIG. 1, the further data module 51 is configured to communicate with one or more remote servers 54 to access a generative model 56. It will be understood that communication between the further data module 51 and the generative model 56 on remote server 54 is via a communication interface, represented by model interface 58.

In the following embodiments, the further data module 51 is configured to generate or obtain a descriptive text for identified groups or segments of users based on user data collected for the users. As described elsewhere, the EPG module 8 and the VOD module 10 obtain information concerning available content from the content sources, for example, a TV service operator or other content service operator. As part of the descriptive text generation, user data, for example, in the form of a user profile is obtained. In embodiments, the user profile is obtained by the further data module 51 from user profile module or user profile table 30.

In the present embodiment, the further data module 51 is depicted as a separate module to the recommendation system 25, however, it will be understood that the further metadata module may be provide as part of the recommendation system or as part of the UX engine. In particular, in some embodiment, the descriptive text may be generated during a recommendation procedure executed by the CRE 22. In some embodiments, the descriptive text may be generated during a content selection process controlled by the UX engine. In embodiments, the generation of the descriptive text is performed by an API call separate to a content recommendation process.

In the present embodiment, the model server 54 hosts a generative model, for example, a machine learning or artificial intelligence model for generating textual information. In the present embodiment, the machine learning model is a generative language model 56. In some embodiments the machine learning model is a generative AI large language model. The machine learning model may be a large language model, for example, a transformer-based language model. Access to the generative model 56 is provided by the model interface 58. The model interface 58 may comprise one or more APIs (Application Programming Interfaces). The model interface 58 is configured to transmit language prompts and requested model parameters packaged as one or more requests to the model server 54. The prompt is provided to the model 56 and the model is configured to output text, in the following embodiments, a synopsis for a content item. The model interface 58 communicates the results to further data module 51.

The content recommendation engine (CRE) 22 in this example is provided as part of an affinity profile generation system, which is operable to generate affinity profiles for users 205 based on first party data in the form of, for example, user actions performed in relation to their selection, viewing and other actions in relation to TV content provided by a TV distribution system, and/or in relation to other content. The recommendation system 2 in the embodiment of FIG. 1 is also able to provide content recommendations to users as well as generating affinity profiles. Content recommendations may be provided in real time or near real time for many thousands, tens of thousands or even hundreds of thousands or more users, for example using techniques as described in UK Patent No. GB 2574581 or U.S. Pat. No. 11,343,573, the content of each of which is incorporated in full herein by reference. However, as noted above, this is an optional arrangement, and the UX engine 12 need not be provided as part of such a recommendation system 2 and can be provided as a stand-alone system or as part of a system with other functionality.

Some example modes of operation are described below in relation to PVRs associated with users, but content may be provided or accessible via any suitable devices, for example set-top boxes, smartphones, PCs or tablets or any other suitable content delivery mechanism.

As discussed further below, the recommendation system is able to communicate, either directly or indirectly, and either via wired or wireless connection, with very large numbers of users or user devices and to provide recommendations for or derived from such users or user devices. Other than some PVRs which are shown schematically in FIG. 1, only a single user device 40 is shown in FIG. 1 for clarity.

The recommendation system 2 is also linked to sources of information concerning available content, in this case an EPG module 8 and a Video-on-Demand (VOD) module which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection. As discussed further below, recommendation system 2 is able to communicate, either directly or indirectly, and either via wired or wireless connection, with very large numbers of users 205 or user devices 40 and to provide recommendations for or derived from such users 205 or their user devices 40. Other than some PVRs which are shown schematically in FIG. 1, only a few user devices 40 are shown in FIG. 1 for clarity, but it will be appreciated that more or less user devices 40 could be present. The user devices 40 could include, as examples only, a user's mobile phone, smart TV, tablet computer, laptop, smart watch or other suitable viewing device. Although the user devices 40 could belonging to the user 205, they could also comprise any other device that the user 205 is logged into.

The EPG is provided as an example of a content selection interface that allows users 205 to look for content available from the service provider and to select content, e.g. for download, streaming and/or viewing. However, the present disclosure is not limited to EPGs and could also be applied to other content selection interfaces, e.g. for music provision services, audio book services, film streaming services, creator content, book or article selection interfaces, amongst others. The content may comprise video, audio, text, images, or other data.

In the embodiment of FIG. 1, the UX engine 12, the EPG module 8, the VoD module 10, the recommendation system 2, the User Cache 6, the PVR Communication module 12, the EPG module 8 and the User Learning module 24 are implemented in a server. The server includes communication circuitry that enables communication between the server, or appropriate components of the server, with each of the user devices, and with the content sources, for example, a TV service operator or other content service operator.

It will be understood that requests and results may be communicated between different parts of a network using one or more application programming interfaces (APIs). The API defines the parameters and other data to be included in a request and the form and format of the results from the request. In particular, the content recommendation procedures described in the following are available through one or more APIs.

Any other suitable implementation of the EPG module 8, the VOD module 10, the recommendation system 2, the CRE 22, the user cache 6, the PVR communication module 12, the EPG module 8 and the user learning module 24 may be provided in alternative embodiments, for example they may be implemented in any software, hardware or any suitable combination of software and hardware. Furthermore, in alternative embodiments, any one of the components as described in relation to the embodiment of FIG. 1 or other embodiments may be combined with any other one(s) of the components, or any one of the components may be split into multiple components providing the same or similar functionality.

The EPG module 8 and the VOD module 10 obtain information concerning available content from the content sources, for example, a TV service operator or other content service operator. The content information comprises metadata of content, for example, television programme metadata. The metadata may be representative of a variety of different content parameters, properties or attributes, for example but not limited to programme title, time, duration, content type, programme categorisation, actor names, genre, release date, episode number, series number. It is a feature of the embodiment that the metadata stored at the EPG module 8 and the VOD module 10 may also be enriched with additional metadata, for example by the operator of the system, such that additional metadata to that provided by the content sources or other external sources may be stored. The content information also include synopses and other descriptive data for content items.

In the embodiment of FIG. 1 the system operates together with three sources of content for a user device: real-time linear television, for example terrestrial or satellite broadcast television; one or more video-on-demand (VOD) services, and pre-recorded video content stored on one or more personal video recorders (PVR). In alternative embodiments, further sources of content as well as or instead of those shown may be used.

The operation of the digital content recommendation system is controlled by the recommendation system 2. As can be seen in FIG. 1, the recommendation system 2 is configured to communicate with the one or more content information modules: the electronic programme guide (EPG) module and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. A personal video recorder (PVR) communication module 12 provides a communication interface between the one or more PVRs 20*a*, 20*b*, . . . 20*z* and the recommendation system 2.

As discussed in more detail below, the user profile module 26 is operable to use first party data obtained by an operator of the system to determine user activity profiles of individual users 205 or sets of users 205, that are representative of actions of a user 205 with respect to content selection interfaces. The content recommendation engine (CRE) 22 can apply a set of processes to determine, in real time, content recommendations for a user 205 based on user data and available content.

The recommendation system 2 has a content recommendation engine (CRE) 22, item based procedure executing module 26 and a user learning module 24. The CRE 22 can apply a set of processes or procedures to determine, in real time, content recommendations for a user based on user data and available content.

The user learning module 24 receives data indicative of selections or other actions by a user and builds up a set of user data, for example comprising or representing a user history or profile, which is stored in the hard disk storage 4, and which is used in generating personalised recommendations for the user.

The UX engine 12 allows for the content selection interface to be configured, which may be at least in part responsive to input from an operative, such as an operative of a content provider service, and/or at least in part automatically, or any combination thereof.

The UX engine 12 allows groups of content to be created. The user content selection interface presents the content items for selection by the user 205 in the groups of content. In an example, each group of content may correspond to a different carousel in a carousel type user interface, but the present disclosure is not limited to this. In some examples, at least one or each group of content may represent a different theme, such as war movies, romances, action movies, nature programs, news and current affairs, and the like. However, this need not be the case, and at least one or each group could be simply selected by the operative or another party. The UX engine 12 also allows the way in which the groups of content are provided or displayed to the user 205 to be customized to that individual user 205 or group of users 205. For example, the UX engine 12 allows customization, e.g. automated customization, of the order in which groups of content are provided to the user in the user content selection interface, which may be an order in which the carousels corresponding to different groups are provided in the content selection interface. In some examples, this comprises allowing selected groups of content to be fixed in a set place in an ordering of the groups of content. In examples, this comprises allowing the UX engine 12 to determine a customized ordering of at least some or all of the groups of content for each user 205 or group of users 205, which may be based at least in part on groups of content that the user 205 or group of users 205 have previously interacted with in some way, e.g. whilst using a user content selection interface.

The ordering of the groups of content (and content recommendations in examples in which the UX engine 12 is part of a recommendation system 2) can be based on user actions, wherein at least some of those user actions include user interaction with content recommendation user interfaces. FIG. 1 shows user actions and requests for recommendations or ordering of content being communicated directly to the recommendation system 2 from the user devices 40. In addition to receiving requests for recommendations of content or ordering of groups of content, the recommendation system 2 is configured to log user activity. By logging user activity and storing activity over an extended period of time, the recommendation system 2 and the hard disk storage 4 can build up an overall picture of the actions of a plurality of users relating to their interactions with content selection interfaces. User actions are turned into learn actions by the user learning module 24 to be processed by the user profile module 26, the UX engine 12 and the content recommendation engine 22.

FIG. 1 shows a user action being received by the recommendation system 2. In addition to receiving requests for recommendation, the recommendation system 2 is configured to log user activity. By logging user activity and storing activity over an extended period of time, the recommendation system 2 and the hard disk storage 4 can build up an overall picture of the viewing activities, habits and preferences of a plurality of users. User actions are turned into learn actions by the user learning module 24 to be processed the content recommendation engine 22.

FIG. 1 also has a further metadata source. In the present embodiment, this is provided on a remote computer, accessible, for example, via the cloud 215. It will be understood that the further metadata source is provided remotely from the content recommendation system and, for example, data sources 8 and 10.

The system of FIG. 1 is configured to operate with a plurality of user devices each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user 205 may be a viewer of the user device. Alternatively or additionally, the user 205 may be a subscriber and/or customer of a service accessible through the user device.

The user cache 6 is coupled to the item based recommendation procedure module 26 and the content recommendations engine 22, and the UX engine 12 and data stored by the user cache 6 may be used by the item based recommendation procedure module 26 and the content recommendations engine 22. The recommendation system 2 can access data stored on the user cache 6. The user cache 6 may be provided in random access memory (RAM) 7.

The hard disk storage 4 is communicatively coupled to the recommendation system 2. The hard disk storage 4 stores data for use by the recommendation system 2. The hard disk storage 4 is configured to store one or more databases. Entries from the databases on the hard disk storage resource 4 can be retrieved by requests made through a data access layer. Entries in the databases may also be updated via the data access layer. The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 36 that represent user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user. A user profile may include user data and associated content metadata.

In the embodiment of FIG. 1, the tables may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in at least one of the tables. The data item may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is not stored in the user learning tables in respect of that action. User data can be stored in respect of a variety of different user actions or events, for example selecting, viewing, recording or searching for content.

In the embodiment of FIG. 1, the tables may include various user learning tables that include data representing user 205 actions, also referred to as user activity, relating to content selection interfaces. on a user interface; downloading content that is in a group of content or related group of content; having watched at least part of content that is in a group of content or related group of content; bookmarking content that is in a group of content or related group of content; browsing content that is in a group of content or related group of content; recording content that is in a group of content or related group of content; adding content that is in a group of content or related group of content to virtual shopping basket or otherwise selecting for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favourite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; and/or rating content that is in a group of content or related group of content, from amongst others.

For example, if a user 205 selects a programme or other item of content from a content selection interface and views or otherwise consumes it for greater than a threshold period of time then a learn action is generated and at least one user data item for that user is stored in at least one of the tables. The data item may include various data including for example start and stop viewing time, time slot identifier, programme identifier, which group of content the content belongs, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is optionally not stored in the user learning tables in respect of that action. User data can be stored in respect of a variety of different user actions or events, for example selecting, viewing, recording or searching for content or any of those listed above or others that would be apparent to a skilled person.

In the embodiment of FIG. 1 it can be understood that a large part of the user data comprises user history or user action data that represent user actions over a significant period of time. In various embodiments, there is a limit to how long user data is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

In the embodiment of a FIG. 1, a distinction is made between different types of user and different sets of the tables are stored for the different types of users.

FIG. 2 is a representation of certain database learning tables stored on the hard disk storage resource 4 of the embodiment of FIG. 1. The system supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favourite content item group information: content source (e.g. EPG or VOD) and unique identifiers for content item groups.

A subscriber may be a person who has subscribed to a particular service rather than the individual who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations. In that case, the content recommendations may be based on attributes and/or user actions for a plurality of individuals associated with the same subscription, for example different members of the same household. The second is time-slot mode where content recommendations are generated in dependence on the particular time slot in question. For example user data generated for a particular time slot may be used selectively in generating content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer nor subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed.

For each user of all categories, there may be separate groups of learning tables. In FIG. 2, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The learned language table 32 stores data relating to audio languages of content items that have been user actioned by the user. For example, the feedback table can store learned language information, the date at which the language was learned and an indication of whether or not the entry has been aged out.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call centre, set-top box). For content item groups, this information includes: customer identifier, time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value; feature ratings; content source ID; client type ID; series title of content item and content item instance identifier. A flag is also stored to indicate if a recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

It can be understood from the description above concerning user learn actions that in a system with a large number of users, user data may be generated almost continuously as users watch programmes and perform other actions. Such user data is stored in the hard disk storage 4.

It can be understood from the description of the nature of the user data, that for a particular user there may be large numbers of individual data items for each user, for example there may be individual data items for each individual relevant user action over the preceding 6 months or other predetermined or selected time period. For example each learn action (e.g. each time a user has watched or recorded a programme at any time during the previous six months or other relevant time period) will have its own data item (e.g. table entry) in the user data. Thus there may be several hundreds or even thousands of data items (e.g. table entries) that need to be read from the hard disk storage 4 for a particular user.

It is a feature of the embodiment of FIG. 1 and at least some other embodiments that during a session for a particular user, the user data for that user may change or be added to. For example, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the recommendation system 2 during the session. Some of these user actions are recorded as learn actions during the session. As discussed, the user learning module 24 has a set of rules for determining which user actions are learn actions.

A learn action may be based on an indication that a user has watched a content item for a specified period of time. The information may be used as an indication of user preferences. As discussed, a minimum event time filter may be implemented to ensure that short period events are not recorded and/or used. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action may be generated according to some embodiments.

New user data, for example new table entries, corresponding to the learn actions for the user ultimately are stored in the hard disk storage 4. However, it is a feature of the embodiment of FIG. 1 and of at least some other embodiments that user data for the user stored in RAM 7 during a session for that user is updated, based on the learn actions for the user occurring during the session, on an ongoing basis. Thus, the user data for a user stored in RAM 7 may change during a session for the user, such that processes are performed based on the most up-to-date user data.

In the embodiment of FIG. 1, the user data for a user is overwritten by the user data stored in RAM 7 (which may be more up-to-date) in response to the end of a session for the user. For example, the updated user data can be provided to the hard disk resource 4 in response to an expiry event. An expiry event may be a user action corresponding to a user terminating a session, terminating watching a content item (e.g. the end of a programme playback) or terminating recording of a content item. Alternatively an expiry event may occur a pre-determined period of time after a user action. For example, an expiry event may be a pre-determined period of time elapsing after a user action corresponding to a user commencing a viewing session.

In some embodiments, all of the user data for the user stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available. Higher priority may be given to updating the user data in RAM 7 than to updating the user data in the hard disk storage 4.

In some embodiments, the user data for a user may be maintained in RAM 7 after the end of a content recommendation session for the user and only deleted from RAM 7 in response to the user data from RAM 7 having been written to the hard disk storage 4.

In at least some other embodiments, each time new user data is generated (for example, when a learn action is generated during a session for a user) it is written both to RAM and to the hard disk storage 4. Thus, an attempt may be made to maintain up-to-date user records for the user in parallel in both RAM and the hard disk storage 4. For example, one option is to provide the updated user data to the hard disk storage 4 at substantially the same time as updating the user data in the user cache 6. Alternatively, priority may be given to maintaining up-to-date user data in RAM 7, with the user data in the hard disk storage 4 only being updated on an as-and-when basis.

Information relating to content available on a real-time linear television broadcast may also be received by the user device and is typically presented to a viewer via an electronic programme guide. The electronic programme guide is interactive. The information relating to the real-time linear television broadcast may be provided by either the service provider or by a third-party content information provider. The information may be delivered to the user device as part of the broadcast or may be provided through alternative means. For example, an internet enabled set-top box may receive a satellite broadcast carrying the content but receive information relating to the broadcast via an internet connection.

The user devices of the system of FIG. 1 comprise or have associated with them local storage devices in the form of PVRs, and each PVR may be considered to represent a content source. Each user may have a PVR for recording broadcasted content and/or for downloading and storing previously broadcast content. The PVR may be part of a user's set-top box or it may be a separate device. The recorded content is stored on a memory of the PVR to be viewed at a later time. FIG. 1 shows a set of n personal video recorders: PV1, PV2, . . . , PVn. Each PVR corresponds to a different user. Each PVR has a collection of content recordings stored on their respective memories. Typically each PVR will have a different selection of stored programmes from the other PVRs. However, more than one PVR may have one or more common programmes stored on their memories at a given time. For example, user of PVR1 and user of PVR2 may have recorded or downloaded the same content item or series of content items. Each PVR may have content items that are not available from other content sources, for example because they are not made available on VoD or have not been re-broadcast. This may also be a result of the age of the content item. For example, the content item may have been available for a certain amount of time from another content source but is no longer available.

In alternative embodiments, the PVRs or other data stores for storing content for users may be implemented in forms other than local storage devices. For example, the data stores may be implemented as storage areas in a cloud storage system or other networked, remote, and/or virtual storage system.

The PVR communication module 12 of FIG. 1 is an interface between the PVRs 20*a*, 20*b*, . . . 20*z* and the recommendation system 2. The recommendation system 2 collects identifying information relating to the content items stored on the PVRs 20*a*, 20*b*, . . . 20*z*. Content items from the PVR of the user can then be taken into consideration in generating content recommendations.

In alternative embodiments, any other data stores, for instance local storage devices, for example any storage devices included in or associated with user devices, may be used as well as or instead of PVRs. In some embodiments, the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

There is description above concerning metadata or other content information that may be used by the system. Content metadata and/or information may, for example, include contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

As part of a session, the content recommendation engine is configured to offer a number of operations to be called using an API. As an example, the content recommendation engine is configured to offer to content recommendation request A user 205 watching a television programme that they have selected on user device 40. Data representing the user's activity is sent to the recommendation system 2 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record for the user. The user record may also be referred to as a user profile.

As a non-limiting example, a user record or user profile may include information that a user has played an episode of Game of Thrones on 14 Jul. 2022, has downloaded an episode of The Simpsons on 15 Jul. 2022, and has just watched an episode of Top Gear on 15 Jul. 2022. The user record will also include metadata associated with each item of content in the record. For example, the meta data items cars, supercars and engineering are associated with the Top Gear episode. In practice there will be many more items of meta data associated with each item of content. In general, a user record will include records of far larger numbers of items of content. However, such a small number of items content might be found for a new user or for a temporary user of a system. For example in some embodiments, the system may be used for a user who is a guest in a hotel or traveler in a vehicle or transport system.

The user data in respect of the user is sent to the content recommendation engine 22 (of the content recommendation system 2) in order to generate or update a user profile for the user 50.

The content recommendation module 22 in this embodiment then performs a search of various data sources, for example in the cloud, to determine any other information concerning the item of content. The data sources can include EPG module, VOD module and other data sources. For example, various databases can be consulted that include additional information concerning television programmes or other items of content.

In the present embodiment, the record for the item of content and any other information found from the search of data sources is subject to processing to match the meta data and other information for the item of content to an ontology of meta data terms that are maintained by the system. Thus, the meta data for the item of content can be enriched, corrected or supplemented.

In the present embodiment the ontology consists of around 38,000 features that can be used as meta data to represent items of content. The ontology defines features in the format <context>:<keyword>. Features describe the content and include subjects, settings, themes and characters (for example, Wimbledon may contain the terms-subject: tennis, sports competition: Wimbledon, theme: sports). Any other suitable ontology can be used in other embodiments. In some embodiments, no ontology is used and the raw metadata associated with the item of content (for example, provided by the content maker, distributor or broadcaster) is used without amendment or enrichment.

The metadata for the item of content is then stored in the user record or user profile in the user profile table 30 in the hard disk storage 4.

As described above, each user has a stored user record or user profile. The system is configured to provide a plurality of content recommendation candidates to a user based on the similarity between the user record and the content metadata.

Operation of the system of FIG. 1 is described in the following. As a first stage, the user 205 initializes a viewing session through a first initiation event. An initiation event can, for example, be a user logging on to a service provider or turning on the user device 40. The initiation event is communicated to the content recommendation module 2 via a communication channel between the user device 40, for example a set top box or other device, for example at the user's home or other remote location, and the content recommendation module 2. In the embodiment of FIG. 1 there is direct communication between the user device 40 and the content recommendation module 2. In alternative embodiments, communication between the user device 40 and the content recommendation module 2 is mediated or passes through, for example a content provider, for instance a TV system operator to which the user subscribes. The initiation event may be treated automatically by the content recommendations module as being a request for recommendations for the user.

In response to the initiation event, the user is then presented, via a display of the user device 40, with a content selection screen displayed on a display screen and/or user interface, which presents the user with a choice of viewing different content items from the content source. For an EPG content source, the content selection screen may form part of the EPG itself. For a VoD content source, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM 7. The user data are maintained in RAM 7 throughout the content recommendation session.

The CRE 22 also maintains content data in the RAM 7, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information as part of a content recommendation process.

Once the CRE 22 has performed the content recommendation process, the content recommendation(s) generated by the CRE 22 are then transmitted to the user device 40 either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation (s) may be transmitted in any suitable fashion either to the user device, or to the database, server or other device. In the present embodiment, software installed at the user device 40 determines whether or how the content item recommendation are displayed on the user interface.

It can be understood that the time constraints on providing content recommendations can be significant, given that personalised content recommendations may need to be generated on the fly, particularly as it may be necessary to provide personalised content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM user data for said plurality of the users substantially simultaneously. For example, user data may be maintained in the RAM 7 for thousands, hundreds of thousands or even millions of users substantially simultaneously, depending on the RAM storage capacity available and the number of subscribers or other users associated with the system.

At the start of a content recommendation session for a user the user data, including all of the various table entries, for the user, are read from the hard disk storage 4 and stored in the user cache 6 in RAM 7, or any other suitable local or rapidly readable storage resource in alternative embodiments. Throughout the content recommendation session the user data stored in the user cache 6 in RAM 7 is used by the CRE 22 to generate content recommendations for the user. This can provide a significant time saving compared to having to read the user data from the hard disk storage 4 each time a content recommendation is needed during the session. At the expiry of a session, the user data for the user is deleted from the cache. The expiry of the session may occur for example in response to no user actions have been received for a pre-determined time period, in response to a user logging off a session or switching off a user device, or in response to loss of communication with the user device. If a new content recommendation session for the user subsequently begins, the user data is read again from the hard disk storage 4 and stored in the user cache 6 in RAM 7.

There is description above concerning metadata or other content information that may be used by the CRE 22 in providing content recommendation. The content information can contain scheduling information (e.g. start and end times for programmes, series information) together with content information regarding the programme itself (e.g. programme description, age rating information). In some embodiments, metadata items may be mapped from an ontology (e.g. the ontology of 38,000 items) to other metadata items in the ontology. Weightings or confidence scores are associated with the mappings in some embodiments. The ontology represents a pre-determined set of properties and/or parameters. The content metadata for content items (or as collected in user data) corresponds to properties and/or parameters selected or assigned weights and/or values from this pre-determined set. The at least one property of the piece of content may comprise a set of tags or other metadata representing properties of an item of content. In the system, the metadata is stored on hard disk storage in metadata table 33.

As part of a content recommendation session, a number of different types of recommendation procedures may be available to be requested. These include procedures, for example based on a weighting, scoring and/or matching process generated based on previous user actions, and matching to available content. In a simple example, if it is determined from the user data that a user has previously watched movies starring a particular actor, or watched football matches featuring a particular team, then the CRE 22 may produce a recommendation for the user to watch a movie or other content featuring that actor, or a programme concerning that football team, if such movie, programme or other content is currently available or will soon be available via the available content sources. It will be understood that the content recommendation procedures may be more sophisticated and, may be for example based on similarities or cross-correlations between different content parameters and user actions and properties based on large amounts of historical data. At least one of the recommendation procedures may use a machine learning derived model to determine recommendation candidates. As a non-limiting example, machine learning techniques such as clustering algorithms for clustering objects that share similarities, such as K-means clustering or neural network based techniques and/or Kohonen based techniques may be suitable.

The content metadata may correspond to values for one or more properties or parameters or characteristics, such as programme title, time, duration, content type, programme categorisation, actor names, genre, release data, episode number, series number, style, mood, language and theme. The properties or parameters or characteristic may include one or more of the following: Audience; Award; Category; Character; Character Type; Concept Source; Director; Format; Franchise; Host; Milieu; Mood; Producer; Person; Subcategory; Scenario; Setting; Sports Competition; Studio; Style; Subject; Team; Theme; Time Period; Writer. These properties or parameters will be understood as a non-exhaustive and non-limiting list. The metadata is represented by metadata items having a value for such properties or parameters. The collected metadata can be considered as representative of user interests and/or preferences based on previous interactions with the content. The metadata items may be provided together with a score so that the metadata represents a degree of the preference or interest for that content property or parameter. The content metadata of the user data may be referred to as user profile features. Content metadata attributes may also be referred to as facets. The following, non-limiting and non-exhaustive list of facets is provided: Actor; Audience; Award; Category; Character; Character Type; Concept Source; Director; Format; Franchise; Host; Mileu; Mood; Producer; Person; Subcategory; Scenario; Setting; Sports Competition; Studio; Style; Subject; Team; Theme; Time Period; Writer. It will be understood that in addition to facets, a number of other categories of content attributes may be used. For example, the desired context may be defined, at least in part, by descriptive content metadata or alternative content characteristics, such as, running time, language, format, age rating. In general, any property or parameter or characteristic capable of distinguishing a sub group of available content from other available content can be used as a content attribute or content metadata. For example, metadata categories as described above or other content information may be suitable. It will be understood that a context can correspond or represented by combination of context attributes. In some embodiments, the context may be associated with at least some of the content that is currently being displayed to a user via the user device.

Figure 3:
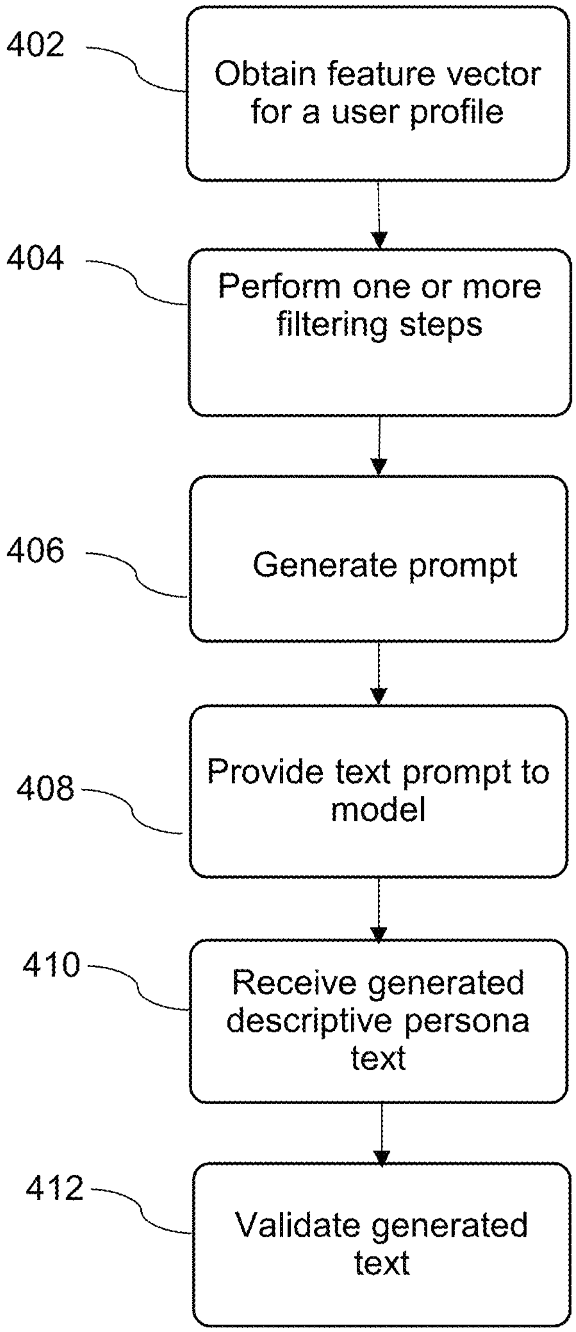
FIG. 3 is an overview of a method of a workflow for generating descriptive text for one or more users.

FIG. 3 depicts a method for generating a descriptive persona text, in accordance with an embodiment, for a user. The method can be incorporated into a workflow or may be performed independently of a content recommendation workflow. In the method of FIG. 3, the generation of the descriptive persona is based on a user profile stored on hard disk storage. The user profile is obtained based on user actions as described with reference to FIG. 1.

At step 402, a feature vector is obtained, for example, generated by the user profile module or from the user profile table 30. The feature vector represents user data for a user. In particular, the feature vector is based on or forms part of a user profile that is determined using content engagement data, for example, as described with reference to FIG. 1. The feature vector may be obtained or generated by user profile module 26 or may have been previously generated and stored on hard disk storage 4, for example, in user profile table 30.

At step 404, one or more filtering steps for the user vector is performed. The one or more filtering steps may include selecting the features of the feature with the highest weight and therefore the most important features. Other filtering steps may be performed, for example, features may be selected based on category and/or other criteria. In some embodiments, the feature vector is truncated or constrained to be a particular size. In some embodiments, no filtering is performed and the prompt at step 404 is generated from the unfiltered vector.

At step 406, the prompt generator 52 processes the feature vector from step 404, to generate a prompt. The prompt is in a suitable input format for the generative language model. In the present embodiment, the prompt is a text string. As a non-limiting example, the prompt is in a human readable format, and is of the format: "Generate a persona title and/or a persona for a user that is interested in A, B and C" where A, B and C are three features selected from the user feature vector based on their associated weights. It will be understood that more than three features may be used.

In some embodiments, generating the prompt includes extracting keywords from the user profile. Given a set of keywords describing a user's taste profile for TV viewing, the prompt may request generation of a persona categorization for the user based on their preferences. For example, if the keywords include "laughs, humor, sitcom," the generated descriptive persona text may be a first descriptor "Comedy Fanatic" together with descriptive text of "This persona is characterized by a love for witty dialogue, quirky characters, and a penchant for comedic timing. They often seek out shows that elicit laughter and enjoy sharing their favorite comedic moments with friends and family."

As a further example, if the keywords include "game, match, scores," the generated persona text may be categorized as "Sports Obsessed." The generated descriptive text may be "This persona is deeply passionate about sports, eagerly tuning in to live games, analyzing player performances, and engaging in spirited debates about team strategies".

The following embodiments may classify the user into a persona category based on their content engagement history, for example, their TV viewing preferences. In some embodiments, the preferences are inferred from keywords and/or metadata extracted from the user profile. In some embodiments, the provided keywords provide insight into their TV watching habits and interests in a relatable manner.

In some embodiments, the generated prompt extract keywords from a user profile and creates a prompt string based on the said keywords. In some embodiments, the prompt may include one or more pre-determined reference descriptive persona texts and the prompt may request a further persona based on the reference persona text based on new keywords.

In some embodiments, the generation of the prompt includes extraction of keywords from the user profile. In the above-described embodiment, the prompt is a human readable text string, however, in some embodiments, a user vector representing the user profile is provided as part of the prompt.

In some embodiments, the keywords include features taken from a pre-determined list of facets, as described elsewhere together with keywords for content the user has previously engaged with, for example, show title, genre, actor, director. Other properties of content that the user has previously engaged with may also be used, for example, metadata relating to preferred language or length of content.

In some embodiments, the generation of the prompt includes providing alternative persona text as part of the prompt. In some embodiments, a set of default or example persona texts are stored and these are retrieved and form part of the prompt. In some embodiments, an example persona text is used as an example in the prompt.

At step 408, the generated prompt is passed as an input to the model, for example, as described with reference to FIG. 1. The machine learning or other generated model may be a generative language model or large language model. It will be understood that, as depicted in the system of FIG. 1, the generative language model is accessible via a model interface 58 that provides a dedicated API and is provided on one or more further computing resources, for example, remote model server 54.

As such, step 408, may include transmitting the prompt to the remote server of the model 54 via model interface. As part of transmitting the prompt to the model, the generated prompt is packaged in a request for the model. The request is in a suitable format for the model, for example, in accordance with an API request for the model. Step 408 includes setting values for model parameters for the request. The parameters will depend on the generative model used. For example, the parameters may include, version or sub-version of the model desired, maximum number of token for the reply. After creating a request, the request is sent to the remote server. The parameters used may include a context window that depends on the size of the users feature vector. The number of reply tokens may be in the range 0 to 200, for example, based on the prompt.

At step 410, in response to receiving the request, a descriptive persona is generated by the model on the remote server 54 based on the prompt and the selected model parameters. Step 410 may include an authentication process with the remote server 54. The generated persona text is then transmitted back to further data module 51.

At step 412, the descriptive persona text generated by the model is received by further data module 51.

At step 414, a validation process is performed on the received generated descriptive persona text. The validation process determines if the output of the persona text generator is relevant and appropriate. At step 414, the validation process includes a further process of evaluating a semantic similarity between the initial feature vector of the user and the returned descriptive text. Any suitable semantic similarity metric may be used, in which the similarity of semantic meaning is represented by a distance. The semantic similarity evaluation may be based on a pre-determined model or other methods.

In some embodiments, the semantic similarity evaluation comprises constructing a persona vector from the output of the text generator. The persona vector will be understood as corresponding to the original user vector used to generate the persona text, for example, the persona vector may be a vector in the same vector space as the user vector. A measure of semantic similarity can then be determined using the persona vector and the original user vector.

In addition, the validating process may include checking the descriptive text for Stop words. Stop words are pre-determined and include, for example, offensive or other forbidden language. If the descriptive text does not pass the validation process, for example, because the semantic similarity is below a pre-determined threshold or includes one or more stop words, the process may return to step 406 to generate a new prompt. The new prompt may include additional constraints based on the validation process, for example, a specific request to not include a stop word.

In some embodiments, the descriptive persona text is then stored on hard disk storage 4 for later use, for example, for a group of users. The descriptive persona may be displayed as part of user interaction interface, for example, a content selection interface governed by UX engine 12. In some embodiments, the descriptive text is displayed to the user on user device 205.

Figure 4:
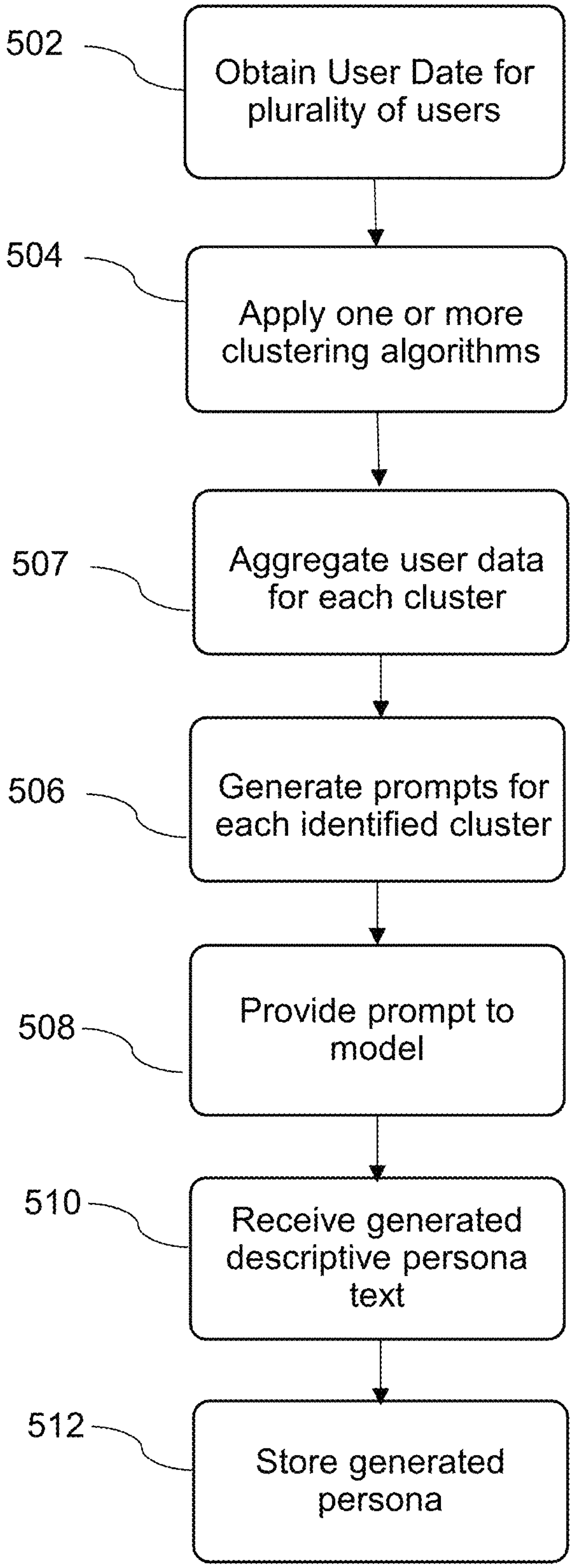
FIG. 4 is an overview of a method of generating descriptive text for one or more users.

FIG. 4 is a flowchart of a further method of generating one or more descriptive persona texts. In contrast to FIG. 3, FIG. 4 relates to methods for generating personas based on the user data of a plurality of users.

At step 502, user data is obtained for a plurality of users. The user data for each user may be represented by any suitable mathematical representation, for example, by a feature vector as described above. Therefore, for a plurality of users there are a corresponding plurality of feature vectors.

At step 504, a clustering algorithm is performed on the user data to identify one or more clusters in the data. Any suitable clustering algorithm can be used at step 504. Alternative segmenting and/or grouping methods can be used. Step 504 involves identifying a number of clusters in the users based on their users. Suitable clustering algorithms include, for example, Kmeans, Kohonen, Gaussian Mixture Model, Neural Networks.

The clustering step includes feeding the individual user profiles into the clustering algorithm to group the user profiles into a plurality of clusters. In further detail, the clustering algorithm is applied to user data for a plurality of users to cluster the users into or more groups or clusters. The clustering process therefore identifies one or more clusters of users based on processing of the user date.

At step 507, a user data aggregation process is performed for each cluster to produce aggregated user data. The data aggregation process comprises creating a feature vector representing the user data for the plurality of users of the cluster, also referred to as an aggregated feature vector. For each cluster, an aggregated feature vector is generated. The aggregated feature vector represents common characteristics of all the users in the cluster. Using the aggregate feature vector, a persona description can be generated as described above, for example, as described with reference to step 408 of FIG. 3.

In the present embodiment, step 507 is performed following the clustering step of step 504. In further embodiments, step 507 is performed at the same time as clustering algorithm at step 504.

At step 506, a prompt is generated for each identified cluster. In contrast to the method of FIG. 3, the prompt is generated based on the aggregated user data for the users of the cluster. In this embodiment, the aggregated user data is represented as the aggregated feature vector. The prompt is then generated substantially as described with reference to step 406 of FIG. 3. It will be understood that a filtering step similar to step 404 may also be performed on the aggregated feature vector.

At step 508, the generated prompt is provided to the model. Step 508 and step 510 substantially corresponds to steps 408 and 410 of FIG. 3 but applied to the aggregated feature vector. It will be understood that the generated persona text applies to a group of users rather than to a single user.

As described with reference to FIG. 3, a validation process may also be performed on the generated descriptive text. This approach is as described with reference to step 412 with appropriate modifications. For example, the semantic similarity evaluation is performed using the returned descriptive text and the aggregated user vector.

As step 512, the generated persona is stored, for example, on hard disk storage in the persona table 58. As described with reference to FIG. 4, the generated persona may be stored for later access. The generated descriptive persona text may be stored together with other data generated during the generation of the persona text. For example, the other data can include the aggregated user profile data or aggregated feature vector for the cluster. Such a profile can be considered to correspond to a user profile for the clustered group.

Figure 5:
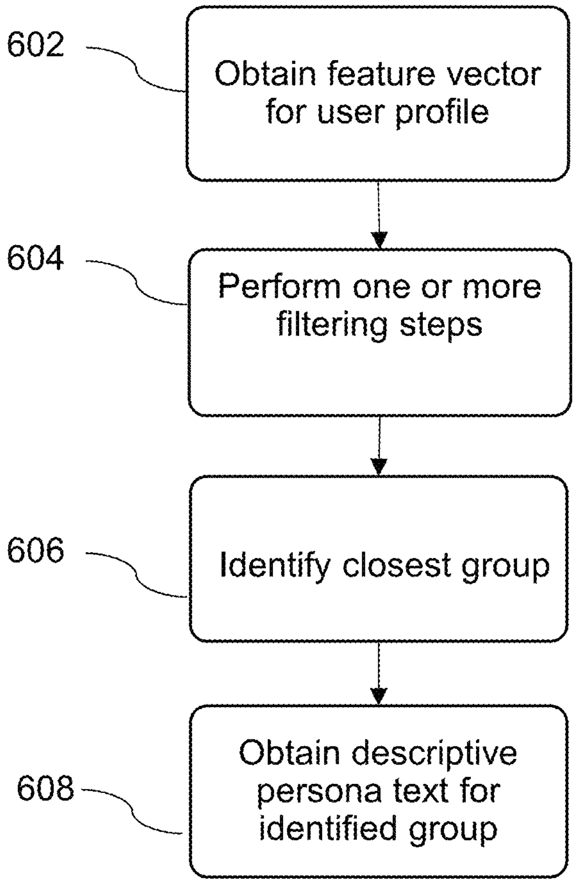
FIG. 5 is an overview of a method of obtaining descriptive text for one or more users, in accordance with a further embodiment.

FIG. 5 depicts a flowchart of a further method of obtaining descriptive persona text for a user from a pre-determined set of descriptive persona text. The method of FIG. 5 uses previously generated persona text stored in persona table 59, in particular, descriptive persona text for a plurality of clusters of users, together with aggregated user data for each cluster. The descriptive persona text for each cluster and the aggregated user data for each cluster is obtained by performed a method such as that described with reference to FIG. 4. For each cluster, the persona text and aggregated user data is stored on hard disk storage 4, for example, on persona table 59.

At step 602, a feature vector for a user is obtained. Step 602 substantially corresponds to step 402. At step 604, one or more pre-filtering steps may be performed, for example, to truncate or reduce the size of the feature vector, substantially as described with reference to step 404.

At step 606, the feature vector for the user is processed to identify the closest matched cluster of the plurality of cluster. This identification may include determining a degree of similarity or match between the feature vector for the user and the aggregated feature vector for each cluster and selecting the cluster that is most similar or close. The degree of similarity or match may include a distance based metric between the vectors.

At step 608, the persona text for the identified cluster is obtained, for example, from the persona table 59.

In some embodiments, at step 608, information associated with the identified cluster may be used to generate the persona text. In some embodiments, the identified cluster may have an associated category label, for example, a pre-determined persona title and the label is used to generate the persona description. In some embodiments, the prompt includes some information associated with the identified cluster.

In further embodiments, modification of the obtained persona text is performed following step 608. In some embodiments, the obtained persona text obtained at step 608 is a default persona text for the identified category of persona for the user. The persona is then used to generate persona text based on the user data. In some embodiments, a prompt is generated using the obtained default persona text together with one or more features from the obtained user data and/or associate content metadata.

While FIGS. 2, 3 and 4 are described as separate methods, it will be understood that elements of these methods may be combined. In some embodiments, the method includes using both stored personas and generating persona text on the fly. In such embodiments, the method may follow the steps of FIG. 5 up to step 606, and then apply a closeness condition such that, if the feature profile vector of the user does not sufficiently match any of the stored persona data, for example, an aggregate user vector obtained for an identified cluster, a request to generate a persona using the generative model is used.

In the above described embodiments, a descriptive persona text was described. In general, the descriptive persona text is a non-attributable description of a user or a group of users based on their user activity. The descriptive persona text does not include any information that would link or identify the user, for example, sensitive, private or confidential information.

Non-limiting examples of the methods are described in the following. As a first example, the generated descriptive persona text has a persona title "Adventure Seeker". The generated persona has descriptive text: This user is an adventurous and daring individual who is always on the lookout for new challenges and excitement. They are particularly drawn to content that revolves around treasure hunts and quests, with a preference for period-style adventures that are set in different historical eras. They enjoy both animated and live-action content that falls within this genre and have a particular affinity for period anime and action adventure subcategories. This user is a fan of the "seinen" audience, a demographic that is targeted towards older adolescent and adult males, and is likely to appreciate shows that offer a mature and sophisticated take on adventure and quest-style themes. Whether they are exploring exotic locations, solving mysteries, or battling enemies, this user is always up for a thrilling ride.

As a further non-limiting example, a generated person has a title: "Laughter Lover(s)" and corresponding descriptive text: "This user is a fan of comedy in all its forms, including stand-up specials, comedy specials, sitcoms, and shows that are centered around humor and laughter. They also have a keen interest in parenting and enjoy content that covers this topic, as well as popular comedians like Pete Lee and Lavell Crawford. The user is a fan of National Lampoon, the well-known comedy brand, and is likely to appreciate shows that offer a similar level of humor and wit. They may also be a fan of "The Fresh Prince of Bel-Air", a classic sitcom that has made audiences laugh for decades. Overall, this user is on the lookout for light-hearted and entertaining content that will bring a smile to their face."

In the above-described embodiments, a persona title and associated descriptive text is described. It will be understood that in accordance with embodiments, the persona title will be shorter than the persona description. Without limitation, the persona title may comprise a descriptive phrase having a length of 10, optionally 5, optionally 3 or fewer words. Without limitation, the persona description may comprise descriptive text having a length of 200 or fewer words.

Although a particular system arrangement is shown in FIG. 1, there are various system arrangements that could be used.

FIG. 6 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40. Access between recommendation system 2 and the model server 54 is provided via a network such as the cloud 215.

FIG. 7 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205. Access between recommendation system 2 and the model server 54 is provided via a network such as the cloud 215.

The processing resource can optionally comprise one or more processors, FPGAs, ASICS or the like, which may be provided in a single machine or distributed over a plurality of machines, and may be locally arranged or remote from each other and connected over a network. The processing resource 220 is configured to communicate with content databases, such as the EPG module 8, to retrieve content available from the content provider. The processing resource 220 comprises rapid access storage, such as user cache 6, which may be implemented in RAM or SSD storage to provide fast access to user profiles and actions that the processing resource is currently, and will next be, performing operations on. The processing resource is also configured to communicate with external storage such as storage device 4 on which user actions and profiles are stored and can be retrieved into the use cache 6 when needed by the processing resource 220.

The system described herein can be used to provide a content selection method and system that may in some examples allow a user to more quickly identify content of interest and to better navigate content available from a content provider system.

Although various specific examples have been described above, these are provided to help understanding of the present disclosure and other possible implementations can be used. For example, although specific arrangements of systems and networks that could be used to implement the concepts disclosed herein are shown in FIGS. 1, FIG. 6 and FIG. 7, other systems architectures could be used. For example, the UX engine 12 could be provided as a standalone system rather than being integrated with the content recommendation engine 22 or integrated into a content provider system rather than being provided as a separate intermediate or backend system.

Method steps described herein can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customized circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented with a user device 40 having a screen, e.g., a CRT (cathode ray tube), plasma, LED (light emitting diode) or LCD (liquid crystal display) monitor, for displaying information (e.g. the content selection interface 605) to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

The above embodiments describes collection of user data. It will be understood that in some embodiments, the system may be configured such to restrict or not allow access to personal information, or data that could be used to determine the name of a user, or demographic information concerning the user.

As such, the above description of specific embodiments is made by way of example only. A skilled person will appreciate that variations of the described embodiments may be made without departing from the scope of the invention.

What is claimed is:

1. A computer-implemented method for generating a descriptive persona text for one or more users of a content recommendation system comprising:

obtaining user data for the one or more users, wherein the user data comprises content metadata associated with a plurality of content items available through the content recommendation system, wherein the content metadata comprises a plurality of content attributes associated with the plurality of content items and associated weightings, wherein each weighting numerically represents a degree of preference of the one or more users to the content attribute associated with the weighting, wherein the weightings are based on user engagement with the plurality of content items for the one or more users;

mapping the user data to a user vector comprising entries representing the metadata attributes and their associated weighting;

performing a filtering process on the user vector to select entries of the user vector based on the weightings;

processing the filtered user vector to generate a prompt for a machine learning or other generative artificial intelligence model based on the weightings of the user vector;

transmitting, over a network, a request to the machine learning or other generative artificial intelligence model at a model server, wherein the request comprises the generated prompt;

generating, by a machine learning or other generative artificial intelligence model at the model server, the descriptive persona text for the one or more users based on the user data and the received prompt, so that the descriptive persona text is generated based on at least the weighting of the content attributes of the metadata for the one or more users, wherein the generated descriptive persona text comprises a persona title and a persona description.

2. The method of claim 1 wherein the method further comprise displaying and/or storing the generated descriptive persona text.

3. The method of claim 1, further comprising obtaining user data for a plurality of users, performing a clustering and/or grouping process on said user data to identify one or more clusters and/or groups of users and generating the descriptive persona text for each identified group based on the user data for the identified cluster and/or group.

4. The method of claim 1 further comprising identifying one or more groups of users and aggregating user data for users of said one or more groups and wherein the generation of the descriptive persona text is based on said aggregated user data.

5. The method of claim 1, wherein generating the persona text for one or more users comprises identifying a persona category from a set of pre-determined persona categories based on the user data for the one or more users and generating the descriptive persona text based on at least the identified persona.

6. The method of claim 1, wherein generating the descriptive persona comprises obtaining a default persona text corresponding to a persona category and performing a modification of the default persona text based on the user data.

7. The method of claim 1, wherein the descriptive persona text comprises one or more references to a content item and/or characteristics of a content item that the user has previously engaged with.

8. The method of claim 1, wherein the descriptive persona text comprises references to content and/or characteristics of content that the user is likely to be interested in.

9. The method of claim 1 wherein generating the descriptive persona text comprises applying a model, for example, a machine learning or other generative artificial intelligence model to at least part of the user data, optionally to an identified persona category, wherein the machine learning model is configured to output the descriptive persona text.

10. The method of claim 1 wherein the model comprises a large language model and/or a natural language processing model and/or a machine learning and/or artificial intelligence model.

11. The method of claim 1, wherein the user data is represented as a feature vector or other data structure and wherein the method comprises generating a prompt or other input for a model based on said feature vector or other data structure.

12. The method of claim 1, wherein generating the descriptive text may comprise packaging at least part of said user data and one or more selected parameters into one or more requests and optionally transmitting said one or more requests to a further computing resource.

13. The method of claim 1, wherein the method comprises performing a filtering and/or selection process on the user data and/or associated metadata and wherein the generating of the descriptive persona text is based on the filtered and/or selected user data.

14. The method of claim 1, further comprising performing a validation process on the generated text and discarding and/or modifying and/or regenerating the descriptive text based on the outcome of the validation process.

15. The method of claim 14, wherein the validation process comprises evaluating a semantic similarity between the user data and the generated text.

16. The method of claim 14 wherein the validation process comprises constructing a vector or other representation of the generated descriptive text and comparing said representation to a corresponding representation of the user data.

17. The method of claims 14 wherein the validation process comprises identifying pre-determined stop words in the generated text and discarding and/or modifying the generated text in response to identifying a stop word.

18. The method of claim 1, wherein the method further comprises using at least part of the generated persona text to obtain one or more content item recommendation.

19. The method of claim 1, wherein the method further comprises displaying the one or more content item recommendations together with at least part of the generated persona text.

20. The method of claim 1, wherein the descriptive persona text comprises a non-attributable description of a user based on their user activity.

21. A system comprising processing circuitry configured to:

obtain user data for the one or more users, wherein the user data comprises content metadata associated with a plurality of content items available through the content recommendation system, wherein the content metadata comprises a plurality of content attributes associated with the plurality of content items and associated weightings, wherein each weighting numerically represents a degree of preference of the one or more users to the content attribute associated with the weighting, wherein the weightings are based on user engagement with the plurality of content items for the one or more users;

map the user data to a user vector comprising entries representing the metadata attributes and their associated weighting;

perform a filtering process on the user vector to select entries of the user vector based on the weightings;

process the filtered user vector to generate a prompt for a machine learning or other generative artificial intelligence model based on the weightings of the user vector;

transmit, over a network, a request to the machine learning or other generative artificial intelligence model at a model server, wherein the request comprises the generated prompt;

generate, by a machine learning or other generative artificial intelligence model at the model server, the descriptive persona text for the one or more users based on the user data and the received prompt, so that the descriptive persona text is generated based on at least the weighting of the content attributes of the metadata for the one or more users, wherein the generated descriptive persona text comprises a persona title and a persona description.

22. A non-transitory computer-readable medium that comprises computer-readable instructions that are executable to:

obtain user data for the one or more users, wherein the user data comprises content metadata associated with a plurality of content items available through the content recommendation system, wherein the content metadata comprises a plurality of content attributes associated with the plurality of content items and associated weightings, wherein each weighting numerically represents a degree of preference of the one or more users to the content attribute associated with the weighting, wherein the weightings are based on user engagement with the plurality of content items for the one or more users;

map the user data to a user vector comprising entries representing the metadata attributes and their associated weighting;

perform a filtering process on the user vector to select entries of the user vector based on the weightings;

process the filtered user vector to generate a prompt for a machine learning or other generative artificial intelligence model based on the weightings of the user vector;

transmit, over a network, a request to the machine learning or other generative artificial intelligence model at a model server, wherein the request comprises the generated prompt;

generate, by a machine learning or other generative artificial intelligence model at the model server, the descriptive persona text for the one or more users based on the user data and the received prompt, so that the descriptive persona text is generated based on at least the weighting of the content attributes of the metadata for the one or more users, wherein the generated descriptive persona text comprises a persona title and a persona description.

* * * * *